(12) United States Patent
De Boodt (10) Patent No.: US 8,952,572 B2
(45) Date of Patent: Feb. 10, 2015

(54) ELECTROMAGNETIC INTERFERENCE MITIGATION

(75) Inventor: Sebastiaan De Boodt, Laarne (BE)

(73) Assignee: Access Business Group International LLC, Ada, MI (US)

( * ) Notice: Subject to any disclaimer, the term of this patent is extended or adjusted under 35 U.S.C. 154(b) by 1075 days.

(21) Appl. No.: 13/001,056

(22) PCT Filed: Jul. 2, 2009
(Under 37 CFR 1.47)

(86) PCT No.: PCT/EP2009/058329
§ 371 (c)(1),
(2), (4) Date: Jun. 30, 2011

(87) PCT Pub. No.: WO2010/000802
PCT Pub. Date: Jan. 7, 2010

(65) Prior Publication Data
US 2013/0187474 A1  Jul. 25, 2013

(30) Foreign Application Priority Data
Jul. 2, 2008 (GB) .................................. 0812021.4

(51) Int. Cl.
| | | |
|---|---|---|
| H02J 17/00 | (2006.01) | |
| H01F 38/14 | (2006.01) | |
| H02J 5/00 | (2006.01) | |
| H02J 7/02 | (2006.01) | |

(52) U.S. Cl.
CPC ............. *H01F 38/14* (2013.01); *H02J 5/005* (2013.01); *H02J 7/025* (2013.01)
USPC ......................................... 307/104

(58) Field of Classification Search
None
See application file for complete search history.

(56) References Cited

U.S. PATENT DOCUMENTS

| | | | |
|---|---|---|---|
| 6,759,937 B2* | 7/2004 | Kyriazidou | .................... 336/200 |
| 6,876,725 B2* | 4/2005 | Rashid-Farrokhi et al. | . 379/1.04 |
| 8,610,310 B2* | 12/2013 | Lockett et al. | ................. 307/104 |
| 2007/0176710 A1* | 8/2007 | Jamneala et al. | ............. 333/191 |
| 2008/0136516 A1 | 6/2008 | Afsahi | |
| 2009/0015075 A1* | 1/2009 | Cook et al. | .................... 307/149 |

FOREIGN PATENT DOCUMENTS

| | | | |
|---|---|---|---|
| EP | 443668 A | * | 8/1991 |
| WO | 2006106481 | | 10/2006 |

OTHER PUBLICATIONS

Roy W. Lewallen, "Baluns: What they do and how they do it", ARRL Antenna Compendium vol. 1, 1985, pp. 157-164.*
International Search Report and Written Opinion for International Application No. PCT/EP2009/058329, mailed Feb. 15, 2010.
Lewallen, Roy W., "Baluns: What they do and how they do it," ARRL Antenna Compendium, vol. 1, 1985.

* cited by examiner

*Primary Examiner* — Rexford Barnie
*Assistant Examiner* — David Shiao
(74) *Attorney, Agent, or Firm* — Warner Norcross & Judd LLP (57) ABSTRACT

A primary unit for transmitting power and/or data wirelessly by electromagnetic induction to a secondary unit separable from the primary unit, the primary unit comprising: a coil (L1, L2); and driving means (30) operable to drive a fluctuating current through the coil, wherein both ends of the coil are decoupled from the driving means so that in use a voltage level at each end of the coil fluctuates with time.

19 Claims, 12 Drawing Sheets

ELECTROMAGNETIC INTERFERENCE MITIGATION

The present invention relates to inductive power and/or data transfer systems, in particular to primary units for use in such systems configured to mitigate potential electromagnetic interference.

It is desirable to be able to transmit power and/or data to devices without having to physically plug in a cable. One promising solution to this problem is to use electromagnetic induction to transfer power wirelessly from the charger (primary unit or transmitter) to the portable device (secondary unit or receiver). These systems have a coil in the charger, through which an alternating current is passed to generate an alternating magnetic field in the vicinity of the coil. A second coil within the portable device is placed in close proximity, so that it couples with the magnetic field resulting in an alternating voltage (and thus, current) being generated in the second coil. A schematic of such a system is illustrated in FIG. 1.

Figure 1:
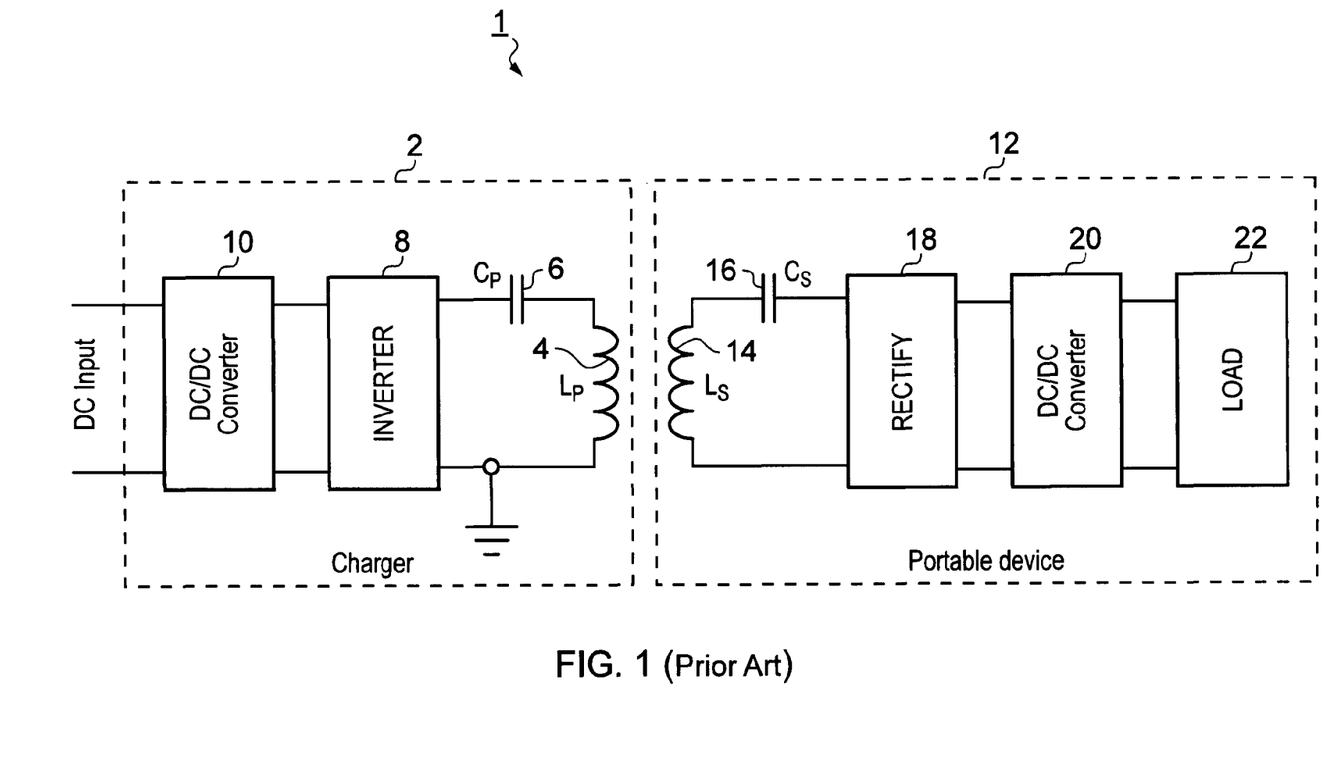
FIG. 1, mentioned above, is a schematic diagram of a previously-considered inductive power/data transfer system.

In FIG. 1, a charger 2 comprises a primary coil $L_p$ 4 which is series resonant with a capacitor $C_p$ 6. This combination is driven by an inverter 8, the inverter 8 drawing power from a DC/DC converter 10. The portable device 12 has a coil $L_s$ 14, its own resonant capacitor 16, $C_s$, a rectifier 18, and its own DC/DC converter 20 configured to drive its load 22. Such a coil-based system can also be used to transmit data instead of or in addition to power (such as for powering the portable device), for example as used in some RFID systems.

It can be particularly difficult to meet electromagnetic compatibility (EMC) regulations for wireless power systems. The field generated has to extend out from the charger in order to couple to the portable device. Consequently, it is not possible to completely shield the coil within the charger. One mechanism which is particularly troublesome is where the electric field generated capacitively couples to other conductors. These conductors may be within the charger itself or external to the charger. This can result in unwanted emissions being conducted along mains cables back to the mains supply.

Figure 2:
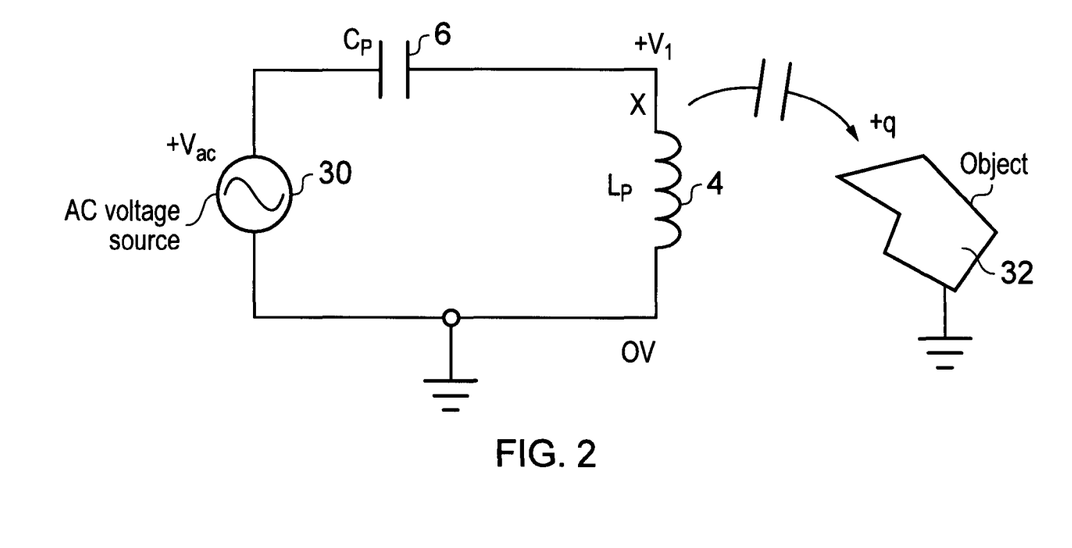
FIG. 2, mentioned above, is a schematic diagram useful for appreciating how an electric field may couple to a conductive object.

FIG. 2 is a schematic diagram useful for appreciating how the electric field may couple to a conductive object. The charger is represented by a coil $L_p$ 4, a capacitor $C_p$ 6, and an AC voltage source 30. The values of $L_p$ and $C_p$ are chosen to be resonant at the frequency of the AC source 30. Also shown is a conductive object 32. The voltage at point X is a sinusoidal voltage, symmetrical about ground, with peak voltage $V_1$ (denoted $+V_1$ in FIG. 2 as it is in-phase with the AC voltage source). At the peak of the positive half cycle in time, the instantaneous voltage at point X is $+V_1$. $L_p$ is capacitively coupled to the object, such that charge $+q$ is induced in the object. Similarly at the peak of the negative half cycle in time, the voltage at X is $-V_1$ and charge $-q$ is induced in the object. If the object is referenced to ground the charge on it will periodically alternative positive and negative. If the object is connected to ground via an impedance, an alternating voltage is induced. This alternating charge can result in a strong signal being conducted back up the mains cable to the mains supply where it is a source of electromagnetic interference.

It is desirable to address the above-mentioned problems.

According to an embodiment of a first aspect of the present invention, there is provided a primary unit for transmitting power and/or data wirelessly by electromagnetic induction to a secondary unit separable from the primary unit, the primary unit having: a coil; and driving means operable to drive a fluctuating current through the coil, wherein both ends of the coil are decoupled from the driving means so that in use a voltage level at each end of the coil fluctuates with time.

Such decoupling may be decoupling in the sense that a non-DC path is provided between each end of the coil and the driving means. Such a path(s) may dominate at a desired frequency of operation over other paths provided.

Such an arrangement leads to a balanced operation of the coil, such that voltage fluctuations at one end of the coil partly or fully compensate for voltage fluctuations at the other end of the coil. In this way, positive and negative charges may be induced in a conductive object, such charges partly or fully cancelling each other out such that reduced noise, due to the electric (electrostatic) field generated by the coil, is suffered by that object.

The primary unit may, for example, be a charger and/or a data-signal transmitter. The primary unit may be provided in circuit form, or may be provided as a structured object, for example having a housing and the like. The secondary unit may, for example, be a portable electrical or electronic device and/or a data-signal receiver. The secondary unit may also be implemented in circuit form, or may be provided as a structured object, for example having a housing and the like.

Both ends of the coil may be capacitively decoupled from the driving means. For example, both ends of the coil may be connected to the driving means via a capacitor. Such an arrangement is a cost-effective and simple way of operating the coil in a balanced or near-balanced fashion. For example, the use of a transformer or a differential output coil driver could add cost and complexity.

Both ends of the coil may be decoupled from any DC source voltage in the primary unit. Both ends of the coil may be decoupled from any DC source voltage present in the primary unit other than along the length of the coil. Such decoupling may be capacitive, for example employing a capacitor as mentioned above. Decoupling the coil from any DC source voltage may assist in the operation of the coil in a balanced or near-balanced fashion. A DC source voltage may however be applied to a point along the coil, for example towards its centre, to assist in balancing the operation around a desired DC voltage level (for example, around a ground or 0 Volts DC level).

The driving means may be an alternating current or voltage source. For example, the driving means may be an alternating voltage source having first and second terminals; and the voltage source may be connected at one of those terminals to a ground source voltage such that it operates as a single-polarity voltage source. Such a voltage source may be implemented as an inverter.

The coil may comprise first and second coil portions; and the first and second coil portions may be configured such that they are magnetically coupled to one another. The first coil portion may have a first end and a second end, the second coil portion may have a third end and a fourth end, and the second and third ends may be connected together such that the first and fourth ends form the ends of the coil. A coupling coefficient between the first and second coil portions may be greater than 0.5 and, optionally within the range 0.9 to 1. For example, the coupling coefficient may be in the range 0.94 to 0.96.

The first and second coil portions may be configured such that coupling takes place from the first portion, in the direction from the first end to the second end, to the second portion, in the direction from the third end to the fourth end. This may be achieved by winding both portions around a core from the same end (starting with the first and third ends), or for example placing the two portions together (with the first and third ends together, and the second and fourth ends together) and arranging them in a desired pattern (for example, in a spiral) together. The coil may be configured such that windings (e.g. all of them) of one of said portions overlap or run alongside windings (e.g. all of them) of the other one of said portions. A direction of winding of the first portion, from the first end to the second end, may thus be the same as a direction of winding of the second portion, from the third end to the fourth end.

A DC source voltage such as a ground source voltage may be connected to the coil between said first and second coil portions. This may assist in balancing the operation of the coil around a desired DC voltage level (for example, around a ground or 0 Volts DC level). A varying source voltage may be used instead of the DC source voltage, however such variance would affect the balance achieved.

The first and second coil portions may be substantially similar to one another. For example they may have the same physical and/or electrical properties. For example, they may have the same inductance as one another. As another example, they may be made of the same material as one another, have the same length and cross-section as one another, and have the same number of turns as one another. The coil portions may be parts of a single coil structure, or they may be distinct coil structures, electrically connected together.

The first coil portion may be a driven portion, configured to be driven by said driving means, and the second coil portion may be a passive portion, configured to be undriven by said driving means. The primary unit may be configured such that in use the first coil portion drives the second coil portion by way of magnetic coupling between the first and second coil portions. The second coil portion may be considered to be a passive portion for example if the ends of that portion are connected to the same or different DC source voltage(s).

The primary unit may be configured such that fluctuations in an effective instantaneous coil voltage, the effective instantaneous coil voltage being the sum of the instantaneous voltages at opposite ends of the coil, have magnitudes substantially smaller than that of fluctuations of a voltage over the coil. The effective instantaneous coil voltage may be substantially constant or stable over time. The effective instantaneous coil voltage may fluctuate closely around or be stably at a ground voltage over time.

The primary unit may be configured such that fluctuations in voltage level at one end of the coil are substantially out of phase (e.g. by 180°) with fluctuations in voltage level at the other end of the coil.

The primary unit may be configured such that, when a voltage level at one end of the coil fluctuates positively away from a ground voltage, a corresponding negative voltage fluctuation is experienced at the other end of the coil. The primary unit may be configured such that voltage signals at the two ends of the coil would if summed exhibit destructive interference. Such a relationship between the coil portions (i.e. one portion cancelling out to some extent the effect of the other in terms of the electric field generated) may be true along the length of the coil.

According to an embodiment of a second aspect of the present invention, there is provided a primary unit for transmitting power and/or data wirelessly by electromagnetic induction to a secondary unit separable from the primary unit, the primary unit having: a coil; and driving means operable to drive a fluctuating current through the coil, wherein the primary unit is configured such that fluctuations in an effective instantaneous coil voltage, the effective instantaneous coil voltage being the sum of the instantaneous voltages at opposite ends of the coil, have magnitudes substantially smaller than that of fluctuations of a potential difference (voltage) over the coil.

According to an embodiment of a third aspect of the present invention, there is provided a primary unit for transmitting power and/or data wirelessly by electromagnetic induction to a secondary unit separable from the primary unit, the primary unit having: a coil; and driving means operable to drive a fluctuating current through the coil, wherein the primary unit is configured such that fluctuations in voltage level at one end of the coil are substantially out of phase with fluctuations in voltage level at the other end of the coil.

According to an embodiment of a fourth aspect of the present invention, there is provided a primary unit for transmitting power and/or data wirelessly by electromagnetic induction to a secondary unit separable from the primary unit, the primary unit having: a coil; and driving means operable to drive a fluctuating current through the coil, wherein the primary unit is configured such that fluctuations in voltage level at one end of the coil are substantially 180° out of phase with fluctuations in voltage level at the other end of the coil.

According to an embodiment of a fifth aspect of the present invention, there is provided a primary unit for transmitting power and/or data wirelessly by electromagnetic induction to a secondary unit separable from the primary unit, the primary unit having: a coil; and driving means operable to drive a fluctuating current through the coil, wherein the primary unit is configured such that, when a voltage level at one end of the coil fluctuates positively away from a ground voltage, a corresponding negative voltage fluctuation is experienced at the other end of the coil.

According to an embodiment of a sixth aspect of the present invention, there is provided a primary unit for transmitting power and/or data wirelessly by electromagnetic induction to a secondary unit separable from the primary unit, the primary unit having: a coil; and driving means operable to drive a fluctuating current through the coil, wherein the primary unit is configured such that voltage signals at the two ends of the coil would if summed exhibit destructive interference.

According to an embodiment of a seventh aspect of the present invention, there is provided a primary unit for transmitting power and/or data wirelessly by electromagnetic induction to a secondary unit separable from the primary unit, the primary unit having: a coil; and driving means operable to drive a fluctuating current through the coil, wherein both ends of the coil are decoupled from any DC source voltage in the primary unit.

According to an embodiment of an eighth aspect of the present invention, there is provided a primary unit for transmitting power and/or data wirelessly by electromagnetic induction to a secondary unit separable from the primary unit, the primary unit comprising: a coil; and driving means operable to drive a fluctuating current through the coil, wherein: the coil comprises first and second coil portions; the first coil portion is a driven portion, configured to be driven by said driving means; the second coil portion is a passive portion, configured to be undriven by said driving means; and the primary unit is configured such that in use the first coil portion drives the second coil portion by way of magnetic coupling between the first and second coil portions.

The primary unit may comprise more than one such first or second coil portion.

According to an embodiment of a ninth aspect of the present invention, there is provided wireless power transfer system, having a primary unit according to any of the aforementioned first to seventh aspects of the present invention and at least one said secondary unit configured to receive power wirelessly from the primary unit.

The present invention extends to method aspects corresponding to the primary unit and systems aspects. Optional features relating to one aspect apply equally to the other aspects. For example, optional features mentioned above in respect of the first aspect apply equally to the second to eighth aspects.

According to an embodiment of a tenth aspect of the present invention there is provided a wireless transmitter for transmitting power and/or data, the transmitter having: a coil, the coil having a first portion and a second portion; the first portion of the coil having a first end and a second end; the second portion of the coil having a third end and a fourth end; an alternating current or voltage source coupled to the coil; wherein the first portion of the coil is magnetically coupled to the second portion of the coil.

According to an embodiment of an eleventh aspect of the present invention there is provided a wireless transmitter for transmitting power and/or data, the transmitter having: a coil, the coil having a first portion and a second portion; the first portion of the coil having a first end and a second end; the second portion of the coil having a third end and a fourth end; an alternating current or voltage source electrically coupled to the coil; wherein the second end is electrically coupled to the third end; wherein the first portion of the coil is magnetically coupled to the second portion of the coil; wherein the orientation of the coupling is such that coupling takes place from the first portion in the direction from the first end to the second end to the second portion in the direction from the third end to the fourth end.

According to an embodiment of a twelfth aspect of the present invention there is provided a method for reducing the electromagnetic interference generated by a wireless transmitter for transmitting power and/or data, the method having the following steps: providing a coil, the coil having a first portion and a second portion; supplying an alternating current or voltage signal to the coil; arranging for the first portion of the coil to be magnetically coupled to the second portion; arranging for the average DC voltage across the coil to be substantially zero.

The coupling coefficient between the first portion of the coil and the second portion of the coil may be close to or substantially 1. The first portion of the coil and the second portion of the coil may physically overlap one another. The point where the two portions of the coil are connected may be connected to ground. The alternating current or voltage source may be single-ended. The alternating current or voltage source may have one end connected to ground. The alternating current or voltage source may be capacitively coupled to the coil. The alternating current or voltage source may be capacitively coupled to both ends of the coil. The capacitors and inductances may form a resonance at the operating frequency of the alternating current or voltage source. The alternating current or voltage source may supply electrical current directly to the first portion of the coil, and the second portion of the coil may receive current only through the mutual coupling with the first portion of the coil.

According to an embodiment of a thirteenth aspect of the present invention there is provided primary unit or a wireless power transfer system substantially as herein described with reference to the drawings.

Figure 3:
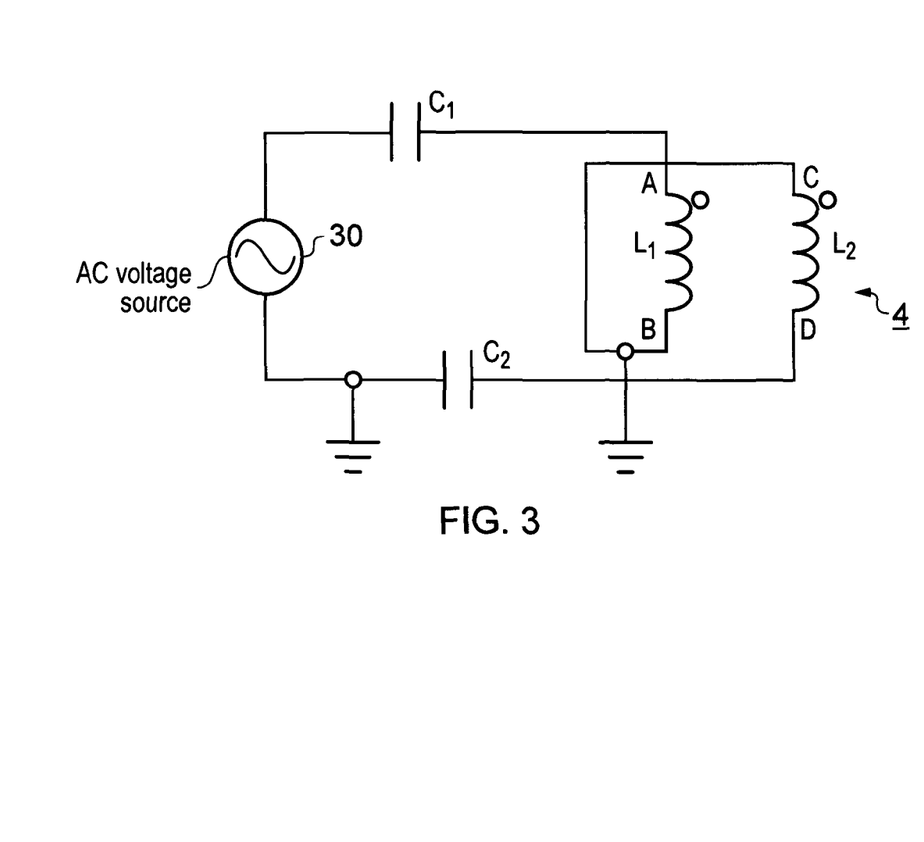
FIG. 3 is a schematic diagram of a charger arrangement (primary unit) embodying the present invention.

Reference will now be made, by way of example, to the accompanying drawings, of which:

FIG. 3 is a schematic diagram of a charger arrangement (primary unit) embodying the present invention. Such an arrangement may have reduced susceptibility to electromagnetic interference compared to that in FIG. 2.

In FIG. 3, in comparison with FIG. 2, the primary coil 4 has been split into two portions, $L_1$ and $L_2$, connected together. These two coil portions are strongly coupled together, such that the coupling coefficient between the two is close to (but not quite) 1. $L_1$ has ends A and B, and $L_2$ has ends C and D. End B is electrically connected to end C. The orientation of the coupling is such that $L_1$ couples along its length in direction AB to $L_2$ along its length in direction CD. Preferably, but not essentially, the midpoint between the coil portions is connected to ground (a DC source voltage). In this arrangement, the resonant capacitor $C_p$ 6 is replaced by two series capacitors $C_1$ and $C_2$, such that $C_1=C_2=2\times C_p$. Series resonance is maintained between $(L_1+L_2+2M_{12})$ and $(C_1+C_2)$, where $M_{12}$ is the mutual inductance between $L_1$ and $L_2$. The first capacitor $C_1$ is connected to the first coil portion $L_1$ at point A and the second capacitor $C_2$ is connected to the second coil portion $L_2$ at point D. The opposite ends of the two capacitors $C_1$ and $C_2$ from the coil are connected to the AC voltage source 30.

The coil 4 can be in constructed in a variety of ways. One way is to wind the first coil portion onto a ferrite core 44, and then to wind the second coil portion on top of the first coil portion around the same core. Preferably, the orientation should be such that the electrical path is in the same physical direction along the core for the two coil portions. FIG. 4 shows some different coil-arrangement examples.

Figure 4A:
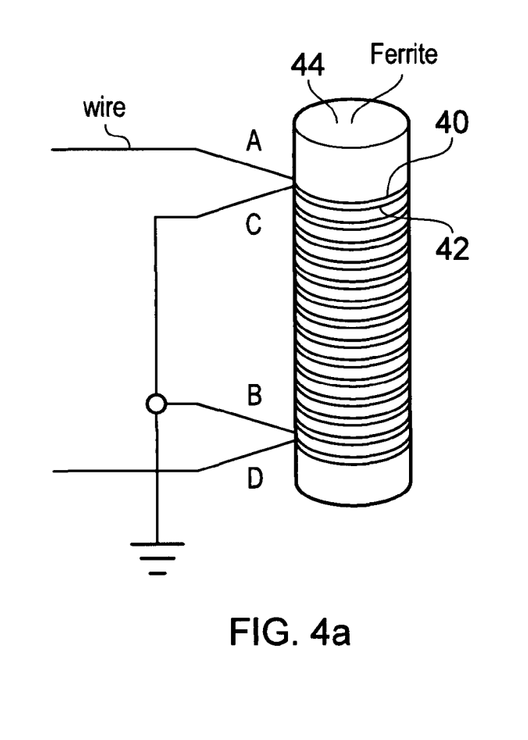
FIG. 4 is a schematic diagram presenting four different possible coil arrangements.

In FIG. 4(a), there are two wires 40 & 42, which are wound together round a ferrite rod core. The two wires may actually be two wire cores in a dual-core cable. The two wires form inductors $L_1$ and $L_2$ respectively. The first wire 40 has ends A and B and the second wire 42 has ends C and D. They are wound together around the core, such that ends A and C are at one end of the core and ends B and D are at the other end of the core. End B is electrically connected to end C and preferably also to ground (a DC source voltage). The two wires may each be subdivided into multiple strands. Preferably such strands are twisted around each other. This can result in a lower AC resistance by mitigating the skin effect and the proximity effect. Such multi-stranded wire is commonly known as Litz wire.

It should be noted that, in the example shown in FIG. 3, both the AC voltage source 30 and the midpoint between the two coils are connected to ground. As a result, the AC voltage source directly supplies current to the first coil portion, but does not directly supply current to the second coil portion. The second coil portion instead receives current via its mutual inductance with the first coil portion. The presence of the ground connections tends to prevent DC offsets from occurring.

Figure 4B:
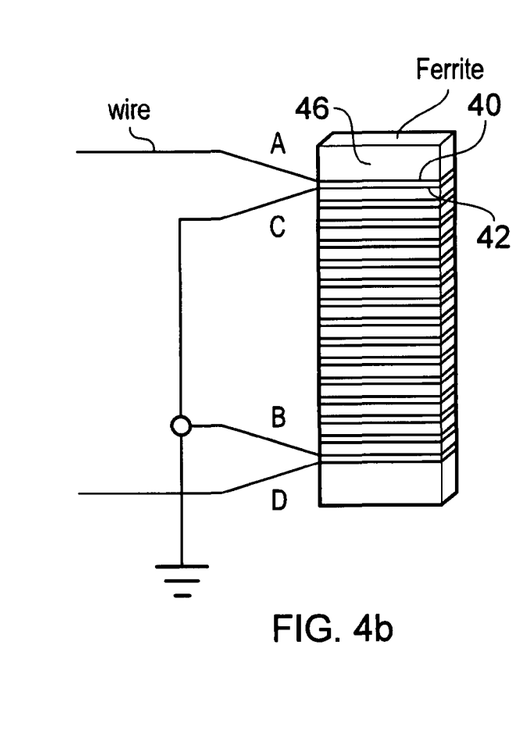
Figure 4C:
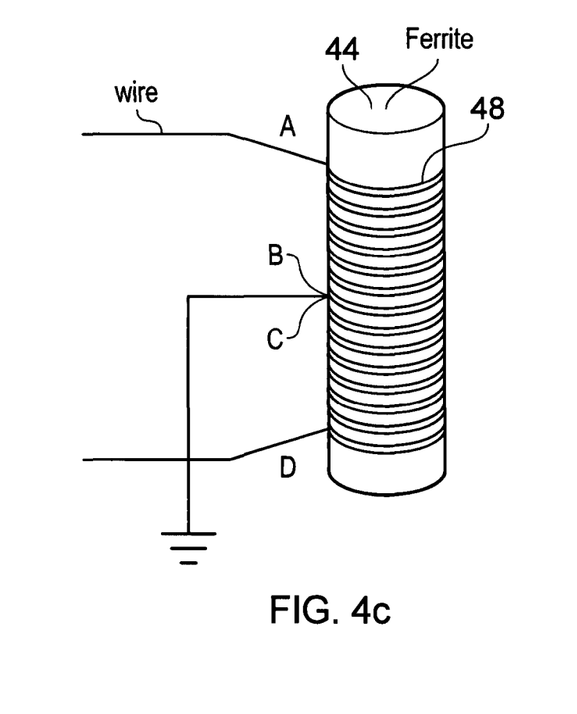

The example in FIG. 4(b) is similar to that of FIG. 4(a), except that the core 46 has a rectangular cross section. FIG.

4(c) shows a coil 48 which has centre tap. There are effectively two coil portions side by side wound around a single core 44 and connected together. The first coil portion has ends A and B, the second coil portion has ends C and D. The two coil portions are wound around the core, such that the ends are in order A, B, C and D along the length of the core, with end B connected to end C and also, preferably, to ground (a DC source voltage). This configuration tends to be less preferable than that in FIGS. 4(a) and 4(b), because the coupling coefficient tends to be lower. Moreover, in the FIG. 4(c) arrangement the load (the secondary unit or some other object) may not couple equally to the two coils, making the arrangement unbalanced.

Figure 4D:
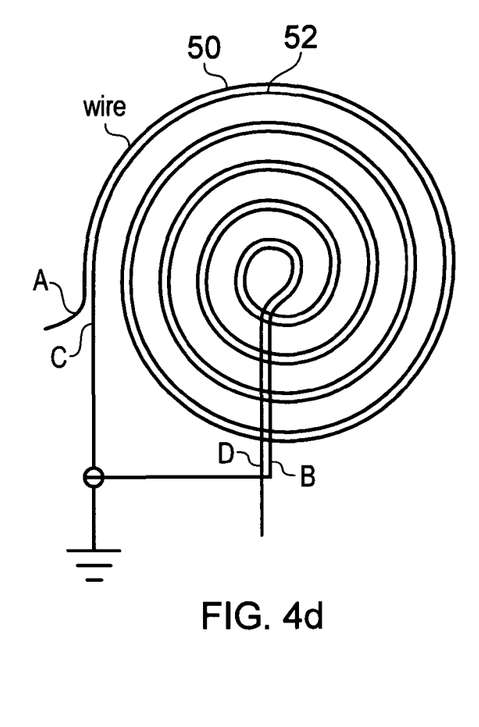

In FIG. 4(d), a flat 'pancake' coil structure is used. In this example, two pieces of wire AB and CD are used. The two wires 50 and 52 are arranged together such that the ends A and C are together and ends B and D are together. Wires 50 and 52 are wound together in a flat spiral shape, such that the two ends A and C are at the outside of the spiral and the two ends B and D are at the inside of the spiral. End C is electrically connected to end B and, preferably (optionally), also to ground (a DC source voltage).

Figure 5:
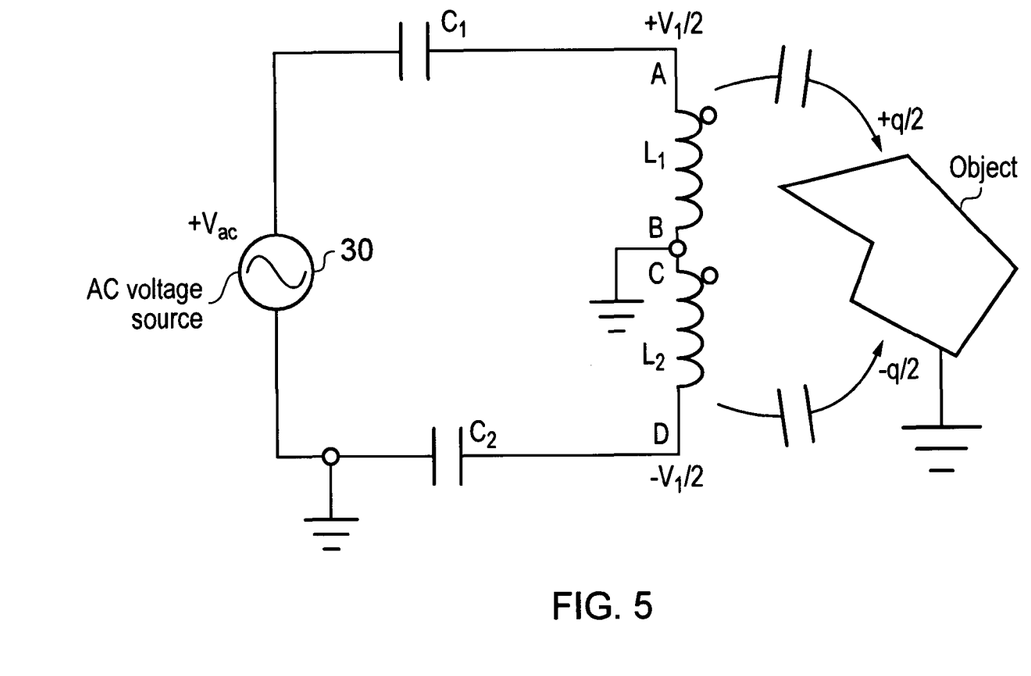
FIG. 5 is a schematic diagram useful for appreciating how embodiments of the present invention help to reduce electromagnetic interference.

FIG. 5 is a schematic diagram useful for appreciating how embodiments of the present invention help to reduce electromagnetic interference, whilst delivering the same amount of power to the portable device (secondary unit). The coil has two parts $L_1$ and $L_2$. Here, point A experiences a sinusoidal voltage, symmetrical about ground, with peak voltage $V_1/2$ (denoted $+V_1/2$ in FIG. 5 as it is in-phase with the AC voltage source). Point D has a similar signal, except that the voltage is substantially 180° out of phase with that at point A. Therefore, the peak voltage at point D is denoted $-V_1/2$ as it is out-of-phase with the AC voltage source. During the peak of the positive half cycle of the AC voltage source, the voltage at point A is $+V_1/2$ V and the voltage at point B is $-V_1/2$ V. $L_1$ therefore (in comparison with FIG. 2) induces charge $+q/2$ and $L_2$ induces charge $-q/2$ on the object 32. The net charge induced in the object is accordingly substantially zero. Similarly, at the peak of the negative half cycle of the AC voltage source, $L_1$ induces $-q/2$ and $L_2$ induces $+q/2$, such that there is also substantially zero net induced charge.

EMC performance is improved because in this arrangement there is both positive and negative charge induced in the object simultaneously, with the result that the net induced charge is substantially zero. A further effect is that the peak voltage relative to ground is halved as compared to that in FIG. 2, reducing the magnitude of charge induced. It is advantageous to connect the midpoint between $L_1$ and $L_2$ to ground, so that the potential does not shift causing a DC offset if the arrangement is not completely balanced.

Figure 6:
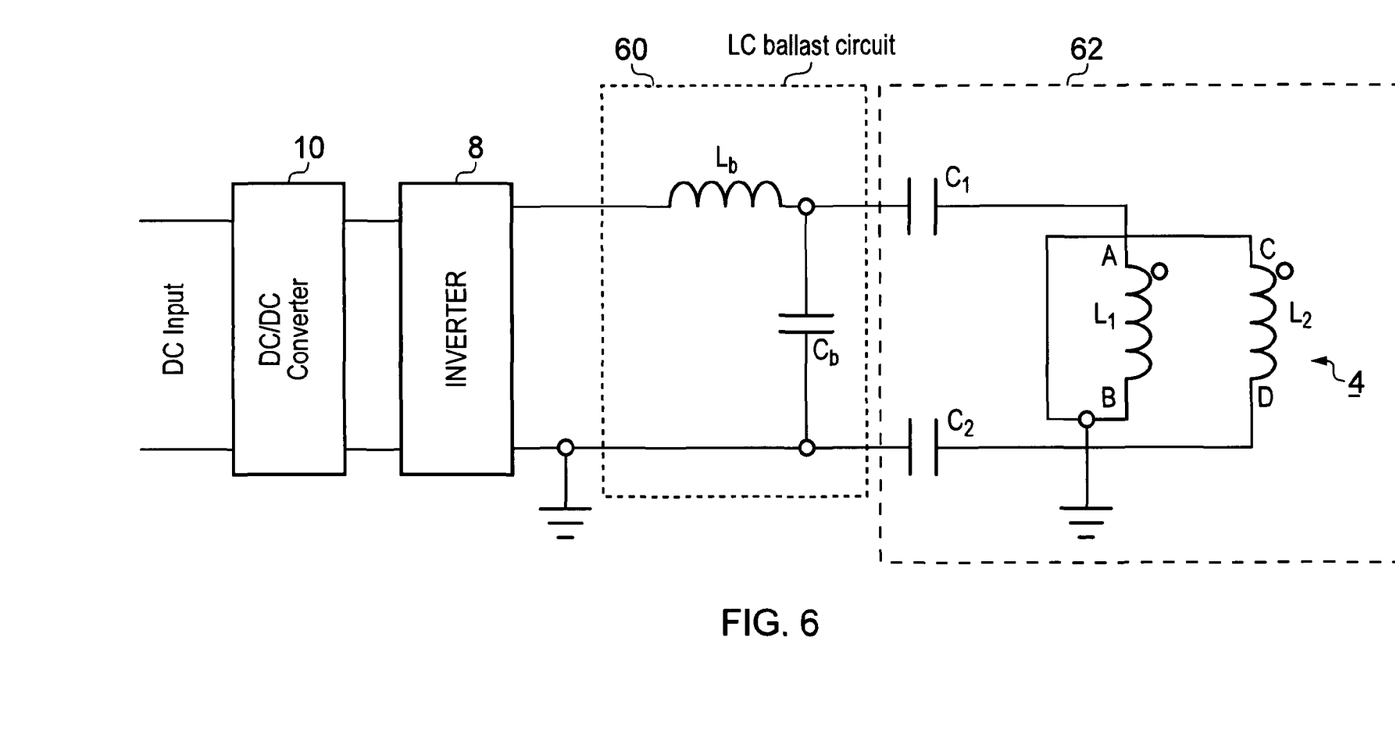
FIG. 6 is a schematic diagram of a charger arrangement (primary unit) embodying the present invention.

FIG. 6 is a schematic diagram of an embodiment having an LC ballast circuit 60. The ballast circuit 60 has a series inductance $L_b$ and a parallel capacitance $C_b$. This type of ballast circuit can help to mitigate against electromagnetic interference as it has a filtering action which reduces the magnitude of higher order harmonics. There is provided an inverter 8 (see FIG. 1) which is coupled to the LC ballast circuit 60. The LC ballast circuit 60 has series inductor $L_b$, between its input and output and a capacitor $C_b$ between the ballast output and ground. The ballast output is connected to the resonant circuit 62 (see FIG. 3).

Figure 7:
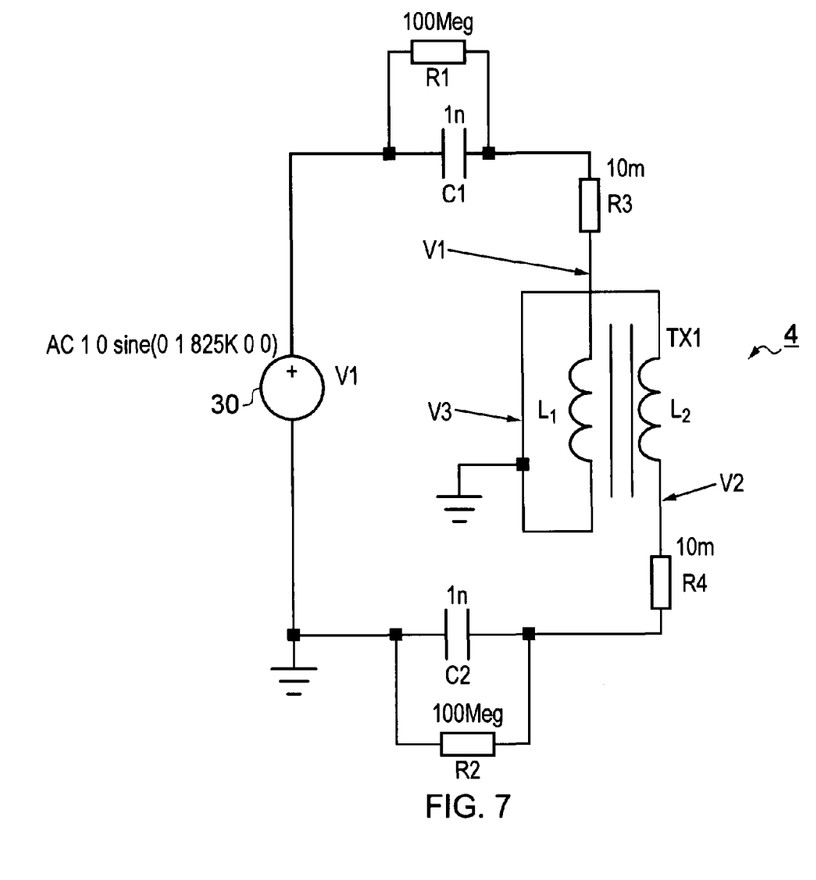
FIG. 7 is a schematic diagram of a simulation model corresponding to the FIG. 3 embodiment.

FIG. 7 is a schematic diagram of a simulation model corresponding to the FIG. 3 embodiment, used to simulate operation of the circuitry. The numbering employed in FIG. 3 has thus been carried over to FIG. 7 for simplicity. Resistances R1 to R4 were added into the simulation model to assist the simulation in reaching convergence.

The AC source 30 was modeled as a 1V peak-to-peak alternating voltage source having a fundamental frequency of 825 kHz. Capacitors $C_1$ and $C_2$ were each assigned a value of 1 nF. The coil 4 was modeled as a transformer, so as to achieve the desired coupling (in this case, a coefficient of 0.95) between portions $L_1$ and $L_2$. For some simulations, a ground source voltage was attached between the portions at point V3 as shown, and in others it was removed.

Simulation results are presented in FIGS. 8 to 11.

Figure 8:
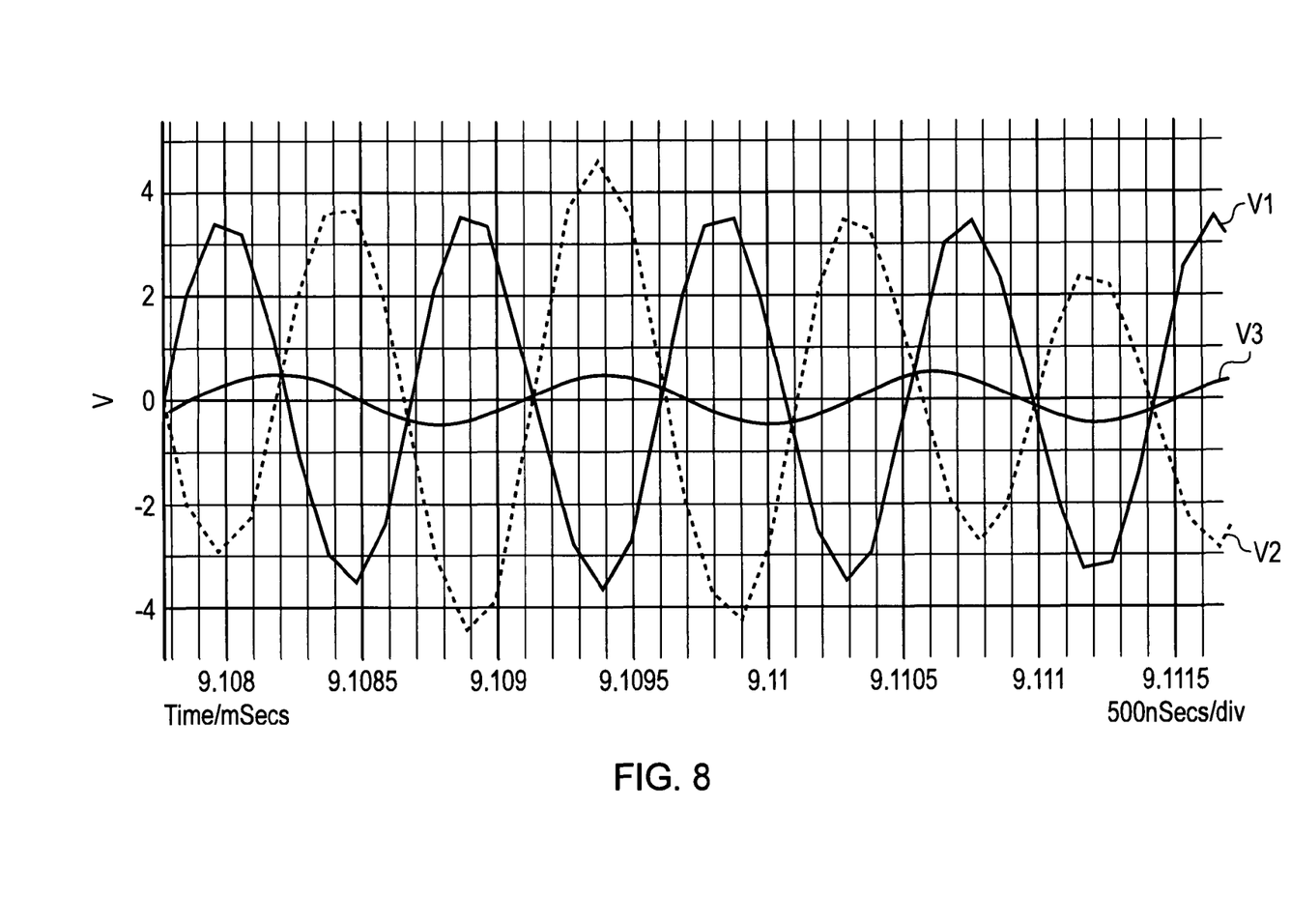
FIGS. 8 to 11 present simulation results.
Figure 9:
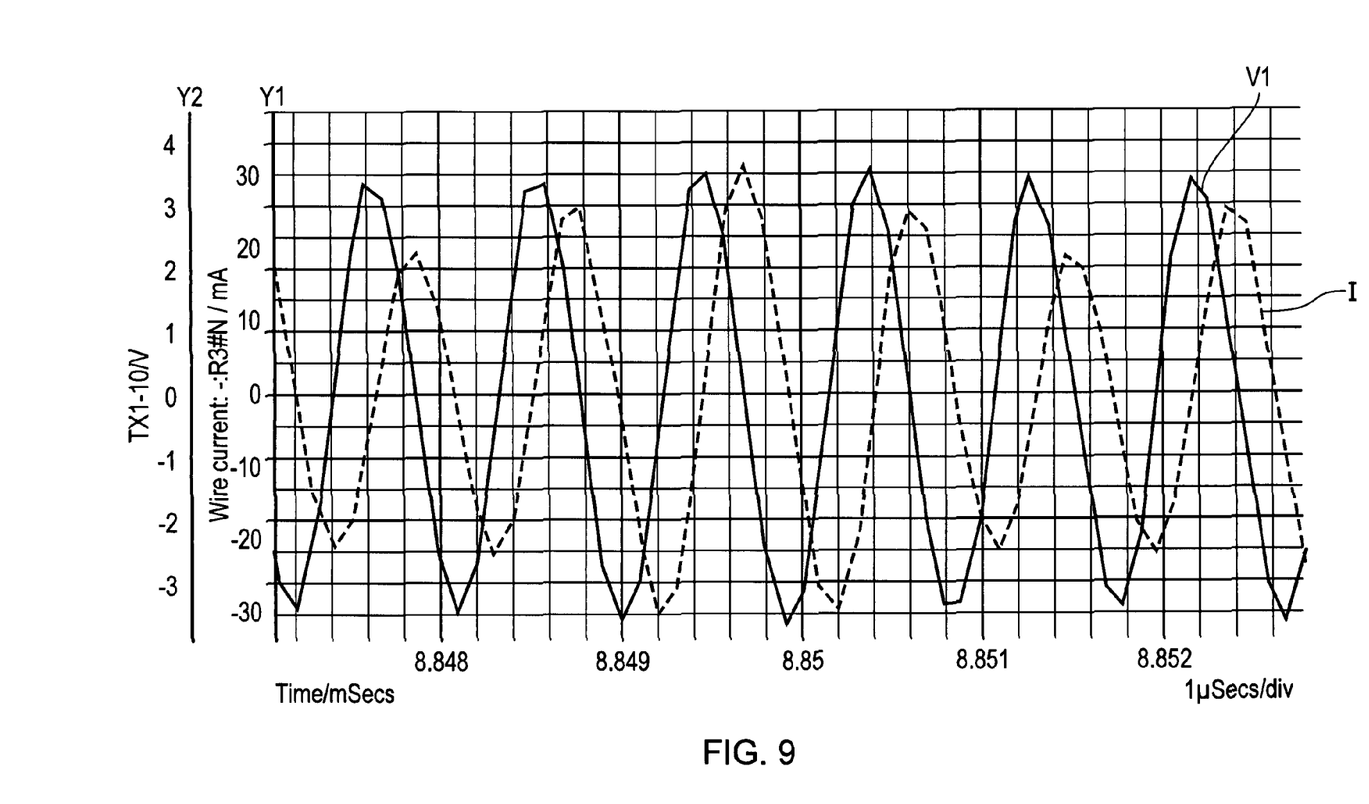

The results in FIGS. 8 and 9 were produced in a simulation in which the ground source voltage shown at point V3 in FIG. 7 was absent. FIG. 8 presents graphs of voltage signals at points V1, V2 and V3, and FIG. 9 presents graphs of a voltage signal at point V1 and a current signal I in the coil. As can be seen from FIG. 8, the voltage signals (V1 and V2) at the two ends of the coil are substantially out of phase with one another. Without the central ground source voltage, there is some drift in voltage V3. Reasonable cancellation of charge imparted on a conductive object could therefore be expected. As can be seen from FIG. 9, there is a 90° phase shift between the voltage and current signals.

Figure 10:
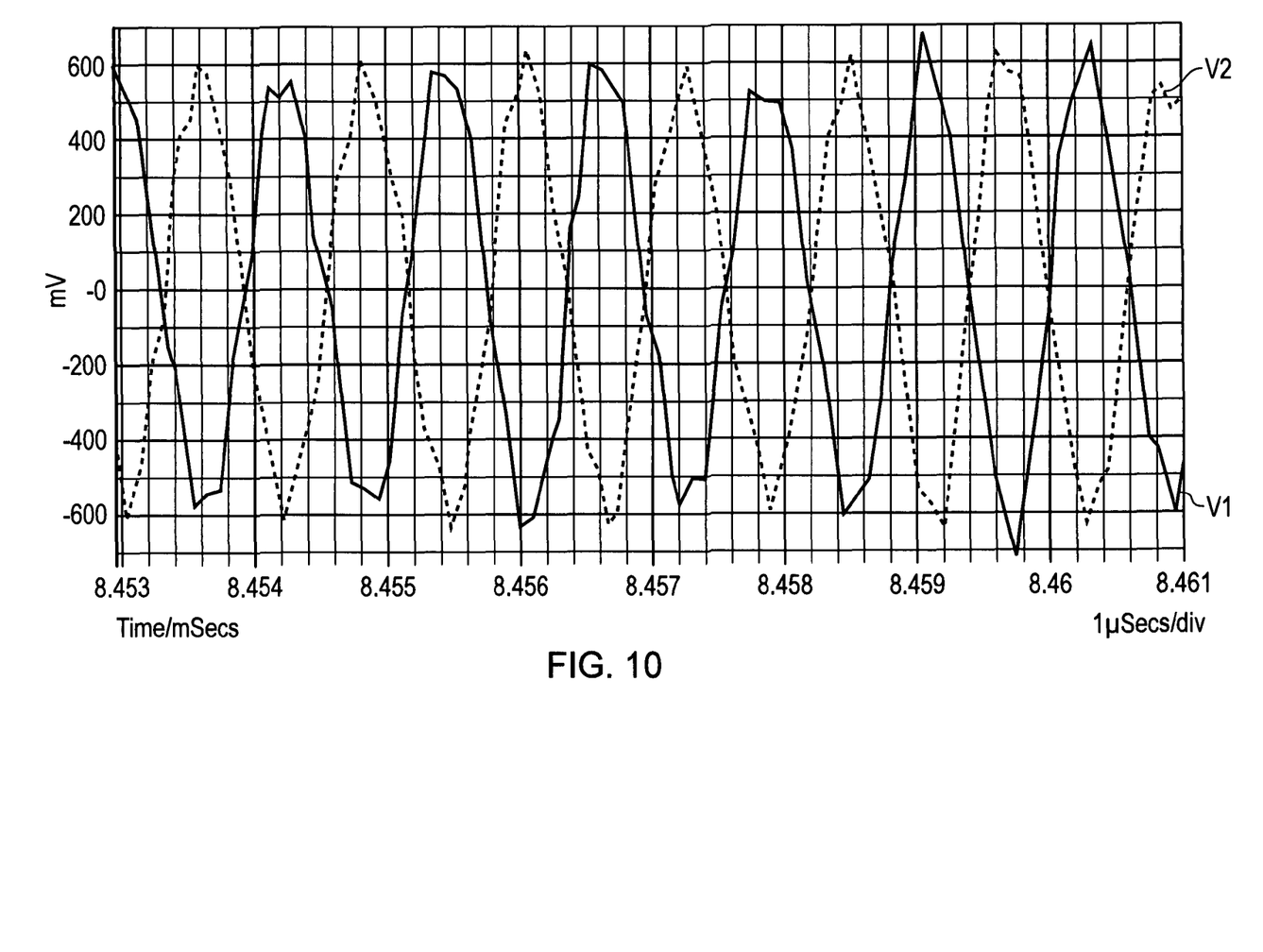

The results in FIG. 10 were produced in a simulation in which the ground source voltage shown at point V3 in FIG. 7 was present. Graphs of voltage signals at points V1 and V2 are presented, the voltage at point V3 being tied to ground. As can be seen, the voltage signals at the two ends of the coil are substantially out of phase with one another, and balanced around a ground voltage. Substantial cancellation of charge imparted on a conductive object could therefore be expected.

Figure 11:
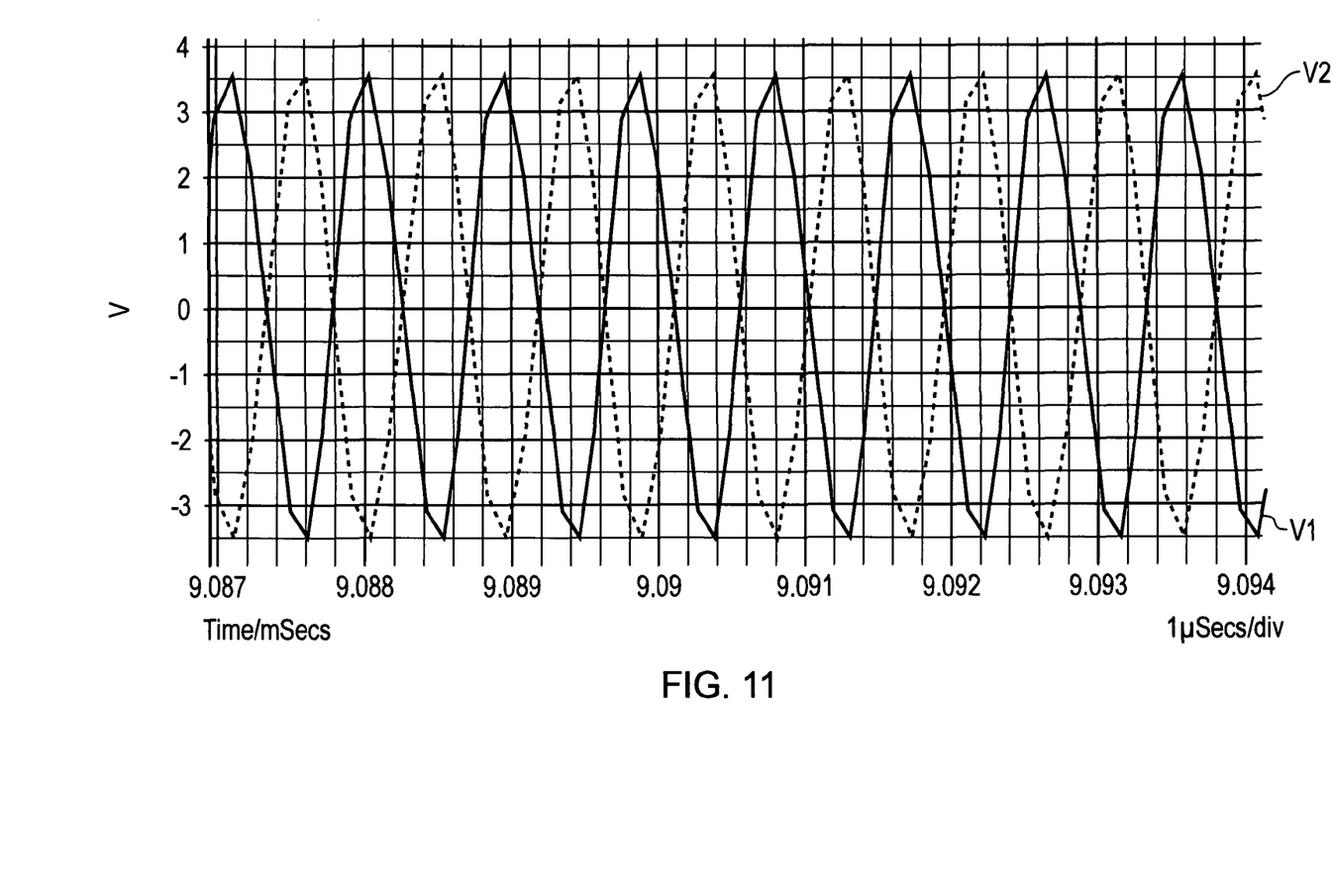

The results in FIG. 11 were produced in a simulation in which the AC source 30 shown in FIG. 7 was configured to alternate between a positive and a negative voltage (for example implemented as an inverter switching between positive and negative rails). The ground source voltage shown at point V3 in FIG. 7 was present. Similarly to the case of FIG. 10, substantial cancellation of charge imparted on a conductive object could therefore be expected.

As will be appreciated, the present invention relates to inductive power/data transfer methods, apparatuses and systems for use, for example, to power and/or supply data to portable electrical or electronic devices.

Inductive power transfer systems suitable for powering portable devices (and/or transferring data thereto) may consist of two parts:
 A primary unit having at least one primary coil, through which it drives an alternating current, creating a time-varying magnetic flux.
 A secondary unit, separable from the primary unit, having a secondary coil.

When the secondary coil is placed in proximity to the time-varying flux created by the primary coil, the varying flux induces an alternating current in the secondary coil, and thus power/data may be transferred/transmitted inductively from the primary unit to the secondary unit.

Generally, the secondary unit supplies the transferred power to an external load (or the data to an external processor, memory or other data-handling means), and the secondary unit may be carried in or by a host object (a secondary device) which includes the load or data-handling means. For example, the host object may be a portable electrical or electronic device having a rechargeable battery or cell. In this case, the load may be a battery charger circuit for charging the battery or cell. Alternatively, the secondary unit may be incorporated in such a rechargeable cell or battery (secondary device), together with a suitable battery charger circuit.

A class of inductive power transfer system is described in GB-A-2388716. A notable characteristic of this class of system is the physically "open" nature of the magnetic system of the primary unit; a significant part of the magnetic path is through air. This permits the primary unit to supply power to different shapes and sizes of secondary unit, and to multiple secondary units simultaneously. Another example of such an "open" system is described in GB-A-2389720. Although focus may be placed on such "open" and "multiple device" systems, this is merely by way of example and it will be appreciated that the present invention may extend to all inductive systems, for example to substantially "closed" systems in which there is a near 1:1 relationship between primary and secondary units with very little placement freedom.

In the context of the present invention, secondary units (and/or secondary devices including such units) may be considered to be any electrical or electronic devices which require power and/or data, and may be portable such devices, for example (i.e. not exclusively) mobile phones, PDAs (Personal Digital Assistants), laptop computers, personal stereo equipment, MP3 players and the like, wireless headsets, vehicle charging units, home appliances such as kitchen appliances, personal cards such as credit cards, and wireless tags useful for tracking merchandise. Primary units may be any form of charger and/or data-transmitter configured for use with such secondary units.

The invention claimed is:

1. A primary unit for wirelessly transmitting at least one of power and data by electromagnetic induction to a secondary unit separable from the primary unit, the primary unit comprising:
a coil operable to transmit the at least one of power and data by electromagnetic induction to the secondary unit;
drive circuitry operable to drive a fluctuating current through the coil, wherein both ends of the coil are capacitively decoupled from the drive circuitry such that in use a voltage level at each end of the coil fluctuates with time; and
wherein the coil includes first and second coil portions, the first coil portion and the second coil portion coupled to a reference such that the first coil portion has a voltage that is substantially equal to and the opposite of the voltage of the second coil portion with respect to the reference, whereby a net charge induced by capacitive coupling of the coil with a proximate object would be substantially zero.

2. A primary unit as claimed in claim 1, wherein each end of the coil is connected to the drive circuitry via a respective capacitor.

3. A primary unit as claimed in claim 1, wherein both ends of the coil are decoupled from any DC source voltage present in the primary unit other than along the length of the coil.

4. A primary unit as claimed in claim 1, wherein:
the drive circuitry is an alternating voltage source having first and second terminals; and
the voltage source is connected at one said terminal to a ground source voltage such that it operates as a single-polarity voltage source.

5. A primary unit as claimed in claim 1, wherein:
the first coil portion has a first end and a second end and the second coil portion has a third end and a fourth end, the second and third ends being connected together at the reference such that the first and fourth ends form the ends of the coil; and
the first and second coil portions are configured such that they are magnetically coupled to one another.

6. A primary unit as claimed in claim 5, wherein the first and second coil portions are configured such that coupling takes place from the first portion, in the direction from the first end to the second end, to the second portion, in the direction from the third end to the fourth end.

7. A primary unit as claimed in claim 5, wherein a coupling coefficient between the first and second coil portions is greater than 0.5 and preferably within the range 0.9 to 1.

8. A primary unit as claimed in claim 5, wherein the coil is configured such that windings of one of said portions overlap or run alongside windings of the other one of said portions.

9. A primary unit as claimed in claim 5, wherein a manner of winding of the first portion, from the first end to the second end, is the same as a manner of winding of the second portion, from the third end to the fourth end.

10. A primary unit as claimed in claim 5, wherein a DC source voltage is applied to the coil between said first and second coil portions.

11. A primary unit as claimed in claim 10, wherein the DC source voltage is a ground source voltage applied to the coil between the first and second coil portions.

12. A primary unit as claimed in claim 5, wherein properties of the first coil portion and properties of the second coil portion are substantially the same.

13. A primary unit as claimed in claim 1 wherein the first coil portion is a driven portion, configured to be driven by said drive circuitry; the second coil portion is a passive portion, configured to be undriven by said drive circuitry; and the primary unit is configured such that in use the first coil portion drives the second coil portion by way of magnetic coupling between the first and second coil portions.

14. A primary unit as claimed in claim 1, configured such that fluctuations in voltage level at one end of the coil are substantially 180 degrees out of phase with fluctuations in voltage level at the other end of the coil.

15. A primary unit as claimed in claim 1, configured such that, when a voltage level at one end of the coil fluctuates positively away from a ground voltage, a corresponding negative voltage fluctuation is experienced at the other end of the coil.

16. A wireless power transfer system, comprising a primary unit as claimed in claim 1 and at least one said secondary unit configured to receive power wirelessly from the primary unit.

17. A primary unit for wirelessly transmitting at least one of power and data by electromagnetic induction to a secondary unit separable from the primary unit, the primary unit comprising:
a coil operable to transmit the at least one of power and data by electromagnetic induction to the secondary unit; and
drive circuitry operable to drive a fluctuating current through the coil, wherein:
the coil comprises first and second coil portions, the first coil portion and the second coil portion coupled to a reference;
the first coil portion is a driven portion, configured to be driven by said drive circuitry;
the second coil portion is a passive portion, configured to be undriven by said drive circuitry; and
the primary unit is configured such that in use the first coil portion drives the second coil portion by way of magnetic coupling between the first and second coil portions, the first coil portion and the second coil portion are physically arranged so that the magnetic fields of the first coil portion and the second coil portion are substantially coextensive and cooperatively induce power in the secondary unit.

18. A wireless power transfer system, comprising a primary unit as claimed in claim 17 and at least one said secondary unit configured to receive power wirelessly from the primary unit.

19. A primary unit as claimed in claim 17, wherein the reference is a ground source voltage applied to the coil between the first and second coil portions.

* * * * *